United States Patent
Remias et al.

(10) Patent No.: US 9,266,102 B2
(45) Date of Patent: Feb. 23, 2016

(54) CATALYSTS AND METHODS OF INCREASING MASS TRANSFER RATE OF ACID GAS SCRUBBING SOLVENTS

(71) Applicant: The University of Kentucky Research Foundation, Lexington, KY (US)

(72) Inventors: Joseph E. Remias, Lexington, KY (US); Cameron A. Lippert, Lexington, KY (US); Kunlei Liu, Lexington, KY (US); Susan Anne Odom, Lexington, KY (US); Rachael Ann Burrows, Morehead, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 178 days.

(21) Appl. No.: 13/853,234

(22) Filed: Mar. 29, 2013

(65) Prior Publication Data

US 2014/0296061 A1    Oct. 2, 2014

(51) Int. Cl.
*B01J 31/22* (2006.01)
*B01D 53/14* (2006.01)

(52) U.S. Cl.
CPC ......... *B01J 31/2243* (2013.01); *B01D 53/1475* (2013.01); *B01D 53/1493* (2013.01); *B01D 2252/20421* (2013.01); *B01D 2252/20431* (2013.01); *B01D 2252/504* (2013.01); *B01D 2252/602* (2013.01); *B01D 2258/0283* (2013.01); *B01J 2531/0252* (2013.01); *B01J 2531/26* (2013.01)

(58) Field of Classification Search
None
See application file for complete search history.

(56) References Cited

U.S. PATENT DOCUMENTS

| | | | |
|---|---|---|---|
| 4,240,922 A | 12/1980 | Sartori et al. | |
| 4,376,101 A | 3/1983 | Sartori et al. | |
| 4,407,784 A | 10/1983 | Blanc et al. | |
| 4,545,965 A | 10/1985 | Gazzi et al. | |
| 4,729,883 A | 3/1988 | Lam et al. | |
| 5,026,904 A | 6/1991 | Lodge et al. | |
| 5,618,506 A | 4/1997 | Suzuki et al. | |
| 5,911,964 A | 6/1999 | Iwanami et al. | |
| 6,165,432 A | 12/2000 | Rooney | |
| 6,337,059 B1 | 1/2002 | Schubert et al. | |
| 6,582,498 B1 | 6/2003 | Sass et al. | |
| 6,921,733 B2 | 7/2005 | Mahajan | |
| 7,056,482 B2 | 6/2006 | Hakka et al. | |
| 7,601,315 B2 | 10/2009 | Ouimet | |
| 7,758,673 B2 | 7/2010 | Brok et al. | |
| 7,763,562 B2 | 7/2010 | Voskoboynikov et al. | |
| 7,939,461 B2 | 5/2011 | Fukuzumi et al. | |

(Continued)

FOREIGN PATENT DOCUMENTS

| | | |
|---|---|---|
| CA | 1277985 C | 12/1990 |
| JP | 11079725 A | 3/1999 |

(Continued)

OTHER PUBLICATIONS

Pun et al. (The Journal Society of Chemistry., Dalton Trans., 2002, 575-583).*

(Continued)

*Primary Examiner* — Yun Qian
(74) *Attorney, Agent, or Firm* — King & Schickli, PLLC

(57) ABSTRACT

A novel transition metal trimer compound/catalyst is disclosed. A method of increasing the overall mass transfer rate of acid gas scrubbing solvents utilizing that catalyst is also provided.

6 Claims, 4 Drawing Sheets

(56) References Cited

U.S. PATENT DOCUMENTS

| | | |
|---|---|---|
| 8,318,651 B2 | 11/2012 | Hatzelt et al. |
| 8,329,929 B2 | 12/2012 | Matsunaga et al. |
| 2002/0081256 A1 | 6/2002 | Chakravarti et al. |
| 2008/0025893 A1 | 1/2008 | Asprion et al. |
| 2009/0214408 A1 | 8/2009 | Blake et al. |
| 2010/0105909 A1 | 4/2010 | Matsunaga et al. |
| 2010/0192770 A1 | 8/2010 | Andarcia et al. |
| 2011/0015059 A1 | 1/2011 | Matsunaga et al. |
| 2011/0168019 A1 | 7/2011 | Northrop et al. |
| 2011/0176981 A1 | 7/2011 | Jacquin et al. |
| 2012/0021897 A1 | 1/2012 | Iwata et al. |
| 2012/0063978 A1 | 3/2012 | Baugh et al. |
| 2012/0063980 A1 | 3/2012 | Kortunov et al. |
| 2012/0237421 A1 | 9/2012 | Millner et al. |

FOREIGN PATENT DOCUMENTS

| | | |
|---|---|---|
| JP | 2003260364 A | 9/2003 |
| WO | 2012034027 A1 | 3/2012 |

OTHER PUBLICATIONS

J. Cullinane, et al.; "Kinetics of Carbon Dioxide Absorption into Aqueous Potassium Carbonate and Piperazine"; Industrial & Engineering Chemistry Research 2006, vol. 45, No. 8, pp. 2531-2545.

* cited by examiner

CATALYSTS AND METHODS OF INCREASING MASS TRANSFER RATE OF ACID GAS SCRUBBING SOLVENTS

GOVERNMENT SUPPORT

This invention was made with government support under grant DE-PI0000017 awarded by United States Department of Energy in connection with the United States-China Clean Research Center. The government has certain rights in the invention.

TECHNICAL FIELD

The present invention relates generally to catalysts and methods of increasing the overall mass transfer rate of acid gas scrubbing solvents utilizing those catalysts.

BACKGROUND

The cleanup of acid gasses or sour gas, such as $CO_2$ in particular, from natural gas and in oil refining has been an extensively practiced technology. The industrial removal of $CO_2$ from natural gas dates back to the 1930's. In the $21^{st}$ century, due to the potential impact of anthropogenic $CO_2$ emissions on the climate, post-combustion $CO_2$ capture has gained tremendous attention. While several technologies exist for the removal of acid gasses one of the most commonly employed practices is the use of aqueous amines. Of these amines, tertiary amines are often used for natural gas applications due to their low energy of regeneration. For post-combustion $CO_2$ capture applications primary and secondary amines tend to be in part favored by their faster rate at the low $CO_2$ driving force condition. Regardless of the application, the mass transfer rate in the absorber column dictates the size of the column (capital cost) used and, consequently, has a substantial impact on the overall process cost. An overall process depicting a thermal swing process is presented in FIG. 1. An aqueous amine solution is circulated between the absorber 10 and stripper 12. The gas, containing $CO_2$, enters the bottom of the absorber where it contacts the aqueous amine absorbent removing it from the gas stream. The liquid solution, $CO_2$ rich amine solution, is then passed through a heat exchanger 14 to improve efficiency before being heated to a higher temperature in the stripper 12. The stripper removes the $CO_2$ as a gas from the amine solution to produce a lean, or $CO_2$ deficient solution. The lean solution is returned to the absorber by way of the heat exchanger 14 to repeat the process.

In order to minimize system capital (absorber cost) it is important to maximize the overall mass transfer rate for the scrubber system as there is a direct correlation between the two. This invention relates to compounds/catalysts and related methods for this purpose.

SUMMARY

A compound is provided having the chemical formula:

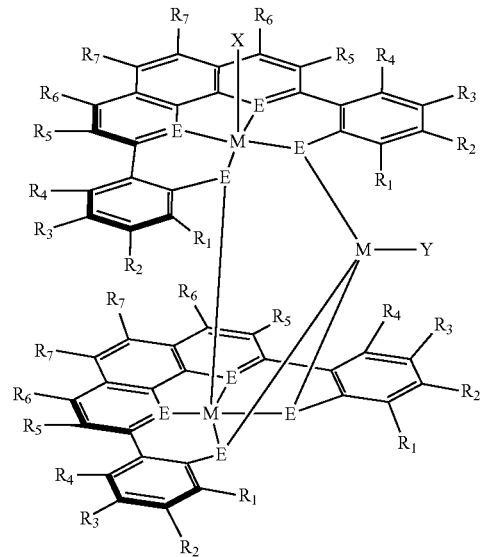

where:
(a) M is any group VII through XII element
(b) E is any combination of N, O, S having a net $2^-$ charge per individual ligand
(c) X and/or Y=halide (e.g. F, Cl, Br, I), acetate, trifluoroacetate, nitro, carbonate, bicarbonate, pyridine, amine, MeCN, $[CN]^-$, —OH, $H_2O$, perchlorate, ethoxide, methoxide, ethanol, methanol
(d) $R_{1-4}$=branched or straight alkyl, amine, —COOH, —$SO_3^-$, PEG, halide, pyridyl, —OR, —ROH
(e) $R_5$=branched or straight alkyl, —COOH, —$SO_3^-$, PEG, halide, —OR, (=O), —CN
(f) $R_6$=branched or straight alkyl, —COOH, —$SO_3^-$, PEG, halide, —OR, (=O)
(g) $R_7$=branched or straight alkyl, amine, —COOH, —$SO_3^-$, PEG, halide, —OR, —$NO_2$, (=O)
(h) R=branched or straight $C_1$-$C_{10}$ alkyl
(i) PEG is —$[OCH_2CH_2]_n$—OZ where Z=H or alkyl and where n is the number of repeat units and can also include cyclic structures.

In one particularly useful embodiment the compound has a chemical formula:

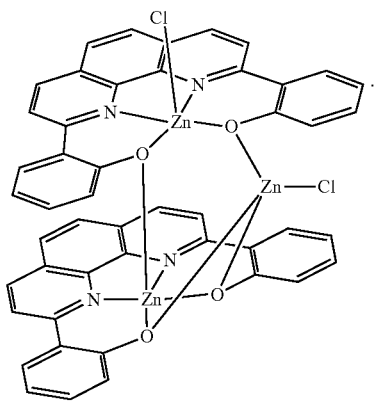

In accordance with an additional aspect of the invention a method is provided for increasing the overall mass transfer rate of an acid gas scrubbing solvent. The method comprises adding a catalyst compound to a fluid stream including an acid gas and an acid gas scrubbing solvent. The catalyst compound has a chemical formula:

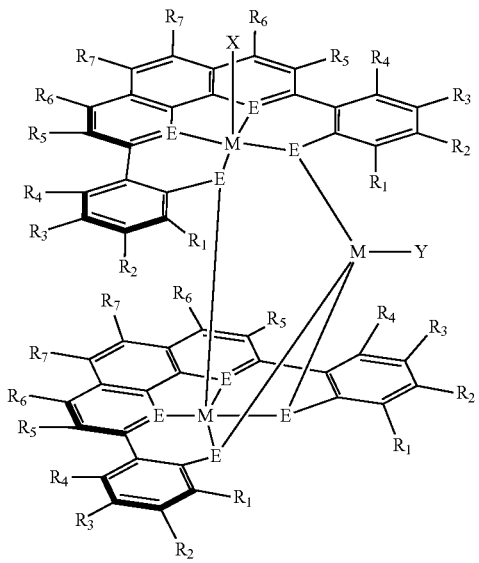

where:
(a) M is any group VII through XII element
(b) E is any combination of N, O, S having a net $2^-$ charge
(c) X and/or Y=halide (e.g. F, Cl, Br, I), acetate, trifluoroacetate, nitro, carbonate, bicarbonate, pyridine, amine, MeCN, $[CN]^-$, —OH, $H_2O$, perchlorate, ethoxide, methoxide, ethanol, methanol
(d) $R_{1-4}$=branched or straight alkyl, amine, —COOH, —$SO_3^-$, PEG, halide, pyridyl, —OR, —ROH
(e) $R_5$=branched or straight alkyl, —COOH, —$SO_3^-$, PEG, halide, —OR, (=O), —CN
(f) $R_6$=branched or straight alkyl, —COOH, —$SO_3^-$, PEG, halide, —OR, (=O)
(g) $R_7$=branched or straight alkyl, amine, —COOH, —$SO_3^-$, PEG, halide, —OR, —$NO_2$, (=O)
(h) R=branched or straight $C_1$-$C_{10}$ alkyl
(i) PEG is —$[OCH_2CH_2]_n$—OZ where Z=H or alkyl and where n is the number of repeat units and can also include cyclic structures.

More specifically, the catalyst compound has the chemical formula:

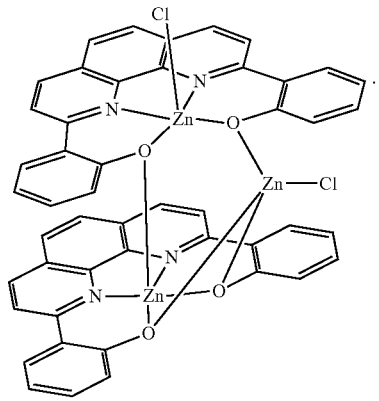

In accordance with additional aspects of the method, the acid gas scrubbing solvent includes an amine ammonia, or a carbonate/bicarbonate solution. In one particularly useful embodiment the acid gas scrubbing solvent includes a mixture of a primary or secondary amine and/or a tertiary amine. In one useful embodiment the catalyst compound is provided in the fluid stream at a concentration of between about 0.1 mM and about 5 mM. In another useful embodiment the catalyst compound is provided in the fluid stream at a concentration of between 5.1 mM and about 25 mM. In yet another useful embodiment the catalyst compound is provided in the fluid stream at a concentration of between 25.1 mM and about 50 mM.

BRIEF DESCRIPTION OF THE DRAWINGS

The accompanying drawings incorporated herein and forming a part of the specification, illustrate several aspects of the catalyst and certain methods of use and together with the description serve to explain certain principles thereof. In the drawing.

Figure 1:
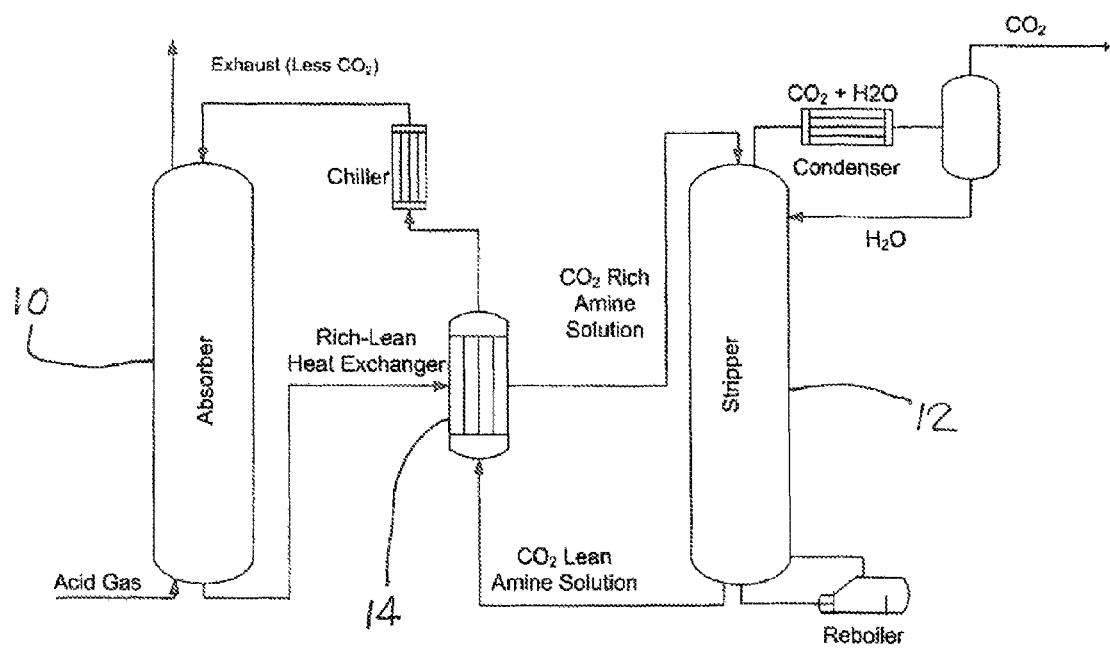
FIG. 1 is a schematical illustration of a process for removing acid gas from a fluid stream utilizing a solvent and thermal swing regeneration.

Reference will now be made in detail to the present preferred embodiments of the catalyst and present method.

DETAILED DESCRIPTION

This document relates generally to novel transition metal ligand trimer complexes. These complexes are stable and are particularly useful as catalysts in a method of increasing the overall mass transfer rate of acid gas scrubbing solvents such as amine solvents. The compounds or catalysts described herein are the product of a unique series of production, purification and isolations steps. More specifically, formation of the compound/catalyst requires two components: (1) the amounts of each component are required to be added in a certain ratio and concentration, and (2) the presence of strongly coordinating monovalent anionic species such as chloride, acetate, ETC. Without the two requirements, the reaction product will form as monomeric species (one metal to one ligand) instead of the desired trimer species (two ligands to three metals with two anions). Purification of the complexes requires that the amount or ratio of certain solvents be used and stored in a certain condition. If this is not done then a mixture of the desired complex and impurities will be isolated together. Using the disclosed method transition metal ligand complexes with purities greater than 70%, 80%, even 90% are obtained from the initial metallization step. After recrystallization, the material is >98% pure.

The compounds/catalysts may be generally described as having a chemical formula:

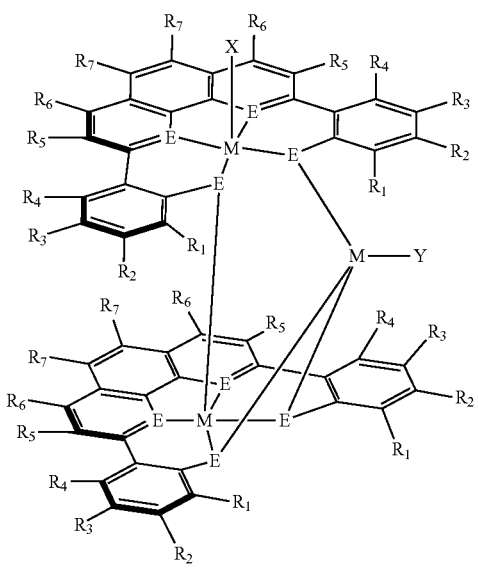

where:
(a) M is any group VII through XII element
(b) E is any combination of N, O, S having a net 2⁻ charge
(c) X and/or Y=halide (e.g. F, Cl, Br, I), acetate, trifluoroacetate, nitro, carbonate, bicarbonate, pyridine, amine (primary, secondary and tertiary), MeCN, [CN]⁻, —OH, H₂O, perchlorate, ethoxide, methoxide, ethanol, methanol
(d) $R_{1-4}$=branched or straight alkyl, amine, —COOH, —SO₃⁻, PEG, halide, pyridyl, —OR, —ROH
(e) $R_5$=branched or straight alkyl, —COOH, —SO₃⁻, PEG, halide, —OR, (=O), —CN
(f) $R_6$=branched or straight alkyl, —COOH, —SO₃⁻, PEG, halide, —OR, (=O)
(g) $R_7$=branched or straight alkyl, amine, —COOH, —SO₃⁻, PEG, halide, —OR, —NO₂, (=O)
(h) R=branched or straight $C_1$-$C_{10}$ alkyl
(i) PEG is —[OCH₂CH₂]$_n$—OZ where Z=H or alkyl and where n is the number of repeat units such as, for example from n=1 to n=10 and can also include cyclic structures.

For any embodiment of catalyst compound, the terms "alkyl" or "any alkyl", when not otherwise stipulated, include at least $C_2$-$C_{10}$ alkyl compounds.

In one particularly useful embodiment the compound/catalyst (CAER-C2) has the chemical formula:

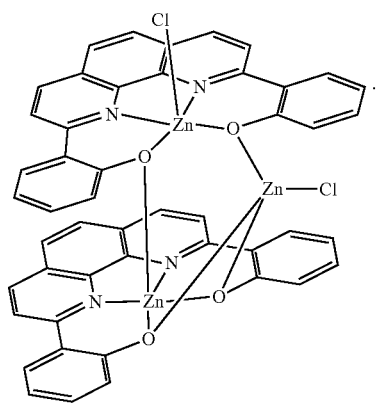

The compounds/catalysts are prepared by reacting two molecules of ligand precursor with three molecules of transition metal salt dissolved in ethanol or other appropriate solvent in a manner explicitly set forth in the following example.

Example 1

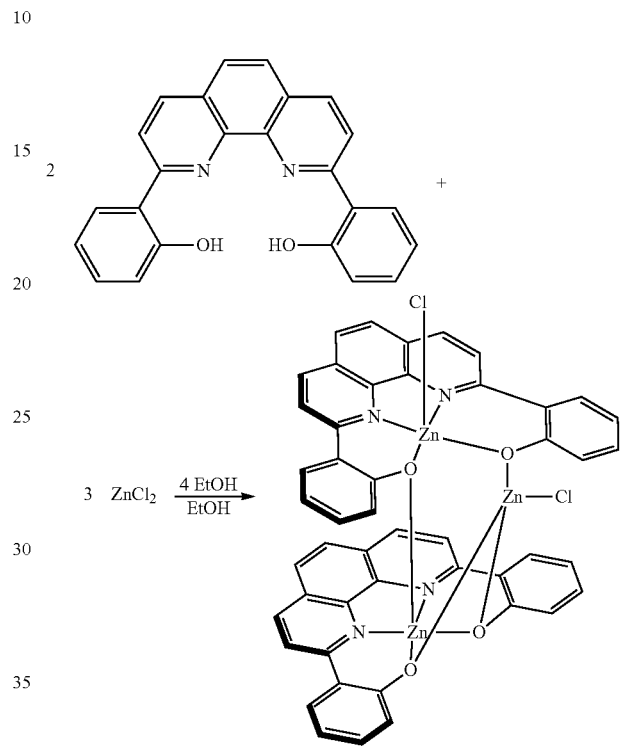

Experimental for the Preparation of Catalyst CAER-C2
*All reactions were performed under N₂ unless otherwise stated.

Preparation of H₂LC2

A 500 mL round bottom flask was charged with 2-bromophenol (3.2 mL, 27.8 mmol) and 250 ml of anhydrous diethyl ether. The solution was cooled in an ice bath and n-butyllithium (22.19 mL, 55.49 mmol of a 2.50 M in hexanes) was added slowly to the solution. The mixture was warmed to ambient temperatures and stirred for 24 hours, at which point a white suspension formed and was transferred via cannula to a solution of 1,10-phenanthroline (1.0 g, 5.55 mmol) and 75 ml of anhydrous toluene at 50° C. to form a yellow solution which quickly became brown. The solution was heated at 50° C. for 48 hr then cooled in an ice bath, exposed to air, and quenched with 60 mL of distilled water. The aqueous layer was separated and washed with ethyl acetate (3×25 mL). The organic layer was collected and washed with distilled water (3×25 mL) and dried over magnesium sulfate. The solvent was removed under reduced pressure to reveal a yellow-orange solid which was subjected to a silica plug using ethyl ether/hexanes (8:3) as the eluent. Evaporation of the solvent under reduced pressure allowed for the isolation of H₂LC2 (419.7 mg, 21%) as a yellow solid. Crystals of X-ray quality were grown by slow diffusion of methanol into a dichlormethane solution.

Preparation of CAER-C2

A 100 mL round bottom flask was charged with 1 equiv. H$_2$LC2 (75 mg, 0.206 mmol) and 1.8 equiv. ZnCl$_2$ (50 mg, 0.368 mmol) and dissolved in EtOH (25 mL) for a final concentration of 0.008M and 0.015M respectively. This provides the required 2:3 ratio of ligand:metal required in the concentration range, 0.002(H$_2$LC$_2$)//0.0038(ZnCl$_2$)M –0.024(H$_2$LC$_2$)/0.045(ZnCl$_2$)M (see scheme 1). 4 equiv. triethylamine (0.125 mL, 0.89 mmol) was added slowly and the mixture was heated at reflux (80° C.), in air, for 3 hours. The mixture was cooled in an ice bath for 60 min and filtered to give CAER-C2 as a yellow powder (96.22 mg, 94%). The complex, CAER-C2, was purified via recrystallization from water/MeCN (1:1), at 25° C., in the presence of up to 200 mol % to CAER-C2 of anionic salts (NaCl or Na trifluoroacetate) with a final concentration of CAER-C2 ranging from $1 \times 10^{-4}$ M-$5 \times 10^{-2}$ M.

The compounds and catalysts disclosed herein are particularly useful in a method of increasing the overall mass transfer rate of an acid gas scrubbing solvent. That method may be generally described as comprising adding a catalyst compound to a fluid stream including an acid gas and an acid gas scrubbing solvent. That catalyst compound has the chemical formula:

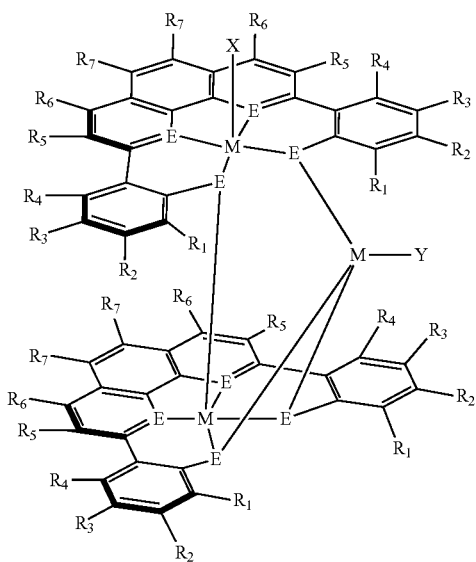

where:
(a) M is any group VII through XII element
(b) E is any combination of N, O, S having a net 2$^-$ charge
(c) X and/or Y=halide (e.g. F, Cl, Br, I), acetate, trifluoroacetate, nitro, carbonate, bicarbonate, pyridine, amine (primary, secondary and tertiary), MeCN, [CN]$^-$, —OH, H$_2$O, perchlorate, ethoxide, methoxide, ethanol, methanol
(d) R$_{1-4}$=branched or straight alkyl, amine, —COOH, —SO$_3^-$, PEG, halide, pyridyl, —OR, —ROH
(e) R$_5$=branched or straight alkyl, —COOH, —SO$_3^-$, PEG, halide, —OR, (=O), —CN
(f) R$_6$=branched or straight alkyl, —COOH, —SO$_3^-$, PEG, halide, —OR, (=O)
(g) R$_7$=branched or straight alkyl, amine, —COOH, —SO$_3^-$, PEG, halide, —OR, —NO$_2$, (=O)
(h) R=branched or straight C$_1$-C$_{10}$ alkyl
(i) PEG is —[OCH$_2$CH$_2$]$_n$—OZ where Z=H or alkyl and where n is the number of repeat units such as, for example from n=1 to n=10 and can also include cyclic structures.

In one particularly useful embodiment the catalyst/compound has the chemical formula:

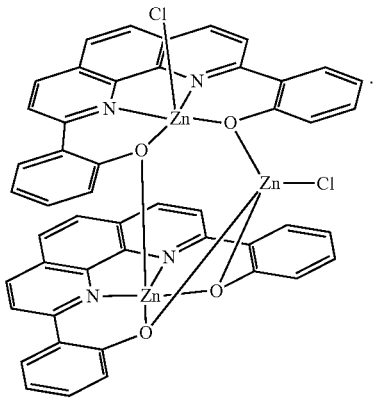

In accordance with additional aspects of the method the acid gas scrubbing solvent may include an amine. In one particularly useful embodiment the acid gas scrubbing solvent includes a mixture of a primary or secondary amine and/or a tertiary amine. Such a gas scrubbing solvent is described in detail in, for example, U.S. patent application Ser. No. 13/853,186, entitled Solvent and Method for Removal of an Acid Gas from a Fluid Stream, filed on Mar. 29, 2013, the full disclosure of which is incorporated herein by reference.

The acid gas scrubbing solvent may be selected from a group consisting of monoethanolamine (MEA), 1-amino-2-propanol (1A2P), 3-amino-1-propanol, 2-amino-1-propanol, 2-amino-1-butanol, 1-amino-2-butanol, 3-amino-2-butanol, 2-(methylamino)ethanol (MAE), 2-(ethylamino)ethanol, morpholine, piperazine (PZ), 1-methylpiperazine (NMP), 2-methylpiperazine, hydroxypiperadine, 2-piperidineethanol, N-aminoethylpierazine (AEP), aminopropylmorpholine, 4-aminopiperidine, 2-amino-2-methyl-1-propanol (AMP), diethanolamine (DEA), diisopropanolamine (DIPA), glycine, alanine, β-alannine, sarcosine, ethylene diamine (EDA), 1,3-propanediamine, 1,4-butanediamine, 1,5-pentanediamine, 1,6-hexanediamine, methyldiethanolamine (MDEA), triethanolamine (TEA), dimethylethanolamine (DMEA), N,N,N',N'-tetramethyl-1,8-naphthalenediamine, diethylmonoethanolamine, dipropylmonoethanolamine, 1,4-dimethylpiperazine, N N,N',N'-tetramethyl-1,6-hexanediamine, N,N,N',N'-tetrakis(2-hydroxyethyl)ethylenediamine, N,N,N',N',N"-pentamethyldiethylenetriamine, N,N,N',N'-tetramethylethylenediamine, N,N,N',N'-tetramethylpropane-1,3-diamine, N,N,N',N'-tetramethylbutane-1,4-diamine, N,N,N', N'-tetramethyl-1,5-pentanediamine, potassium carbonate, and mixtures thereof. In one possible embodiment the catalyst compound is provided in the fluid stream at a concentration of between about 0.1 mM and about 5 mM. In another possible embodiment the catalyst compound is provided in the fluid stream at a concentration of between about 5.1 mM and about 25 mM. In yet another possible embodiment the catalyst compound is provided in the fluid stream at a concentration of between about 25.1 mM and about 50 mM. In the following example, the performance of the catalyst compound is evaluated.

Example 2

The performance of CAER-C2 was evaluated with several aqueous amine solvents including the most widely studied amine, 30 wt % MEA, and four other aqueous amine solvents determined by CAER as preferred $CO_2$ capture solvent choices (see FIGS. 3-7). The removal rates with respect of $CO_2$ loading (C/N) were measured for blank solvents and solvents with CAER C2 catalyst using the screening method introduced below.

Figure 3:
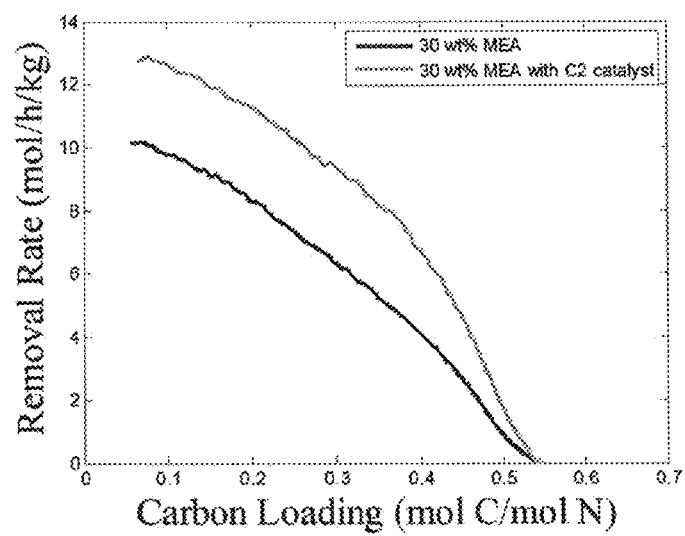
FIGS. 3-7 are graphs illustrating the performance of one embodiment of the present catalyst evaluated with five different aqueous amine solvent systems for recovering $CO_2$ from a fluid stream.
Figure 4:
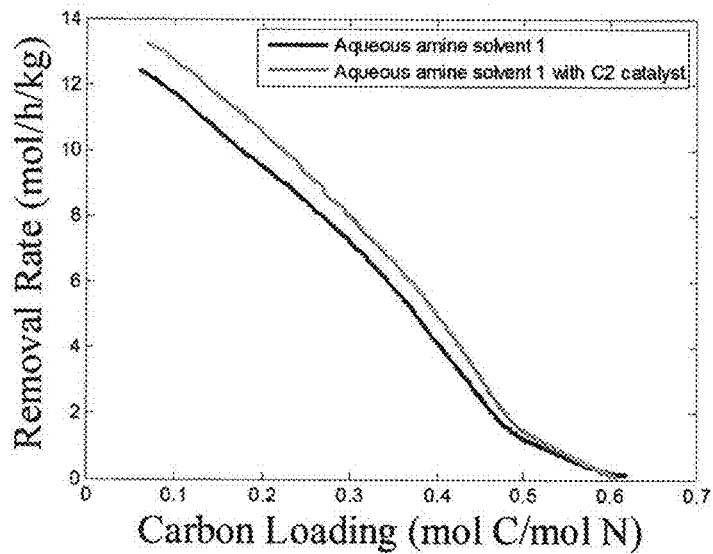
Figure 5:
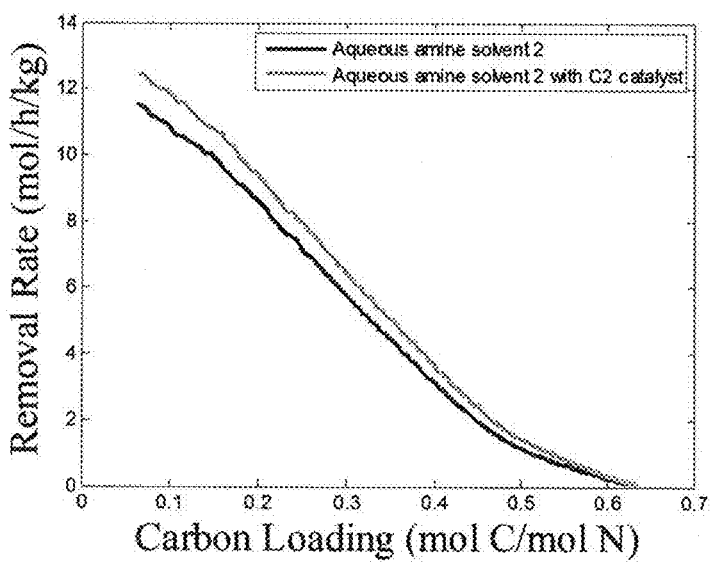
Figure 6:
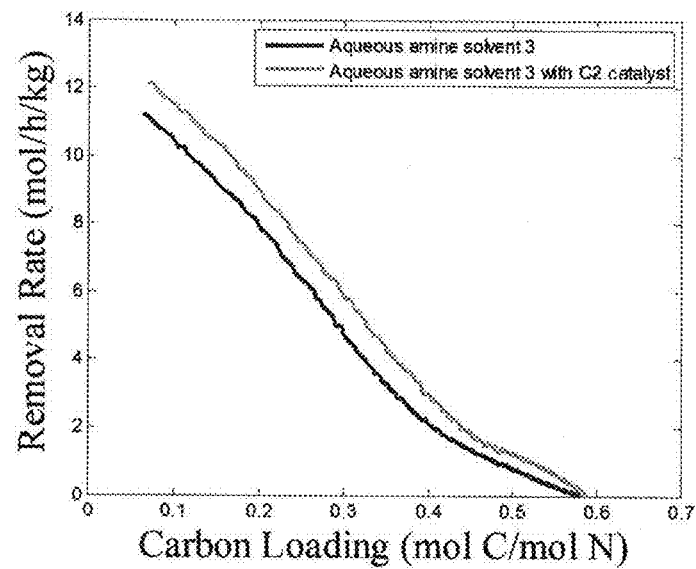
Figure 7:
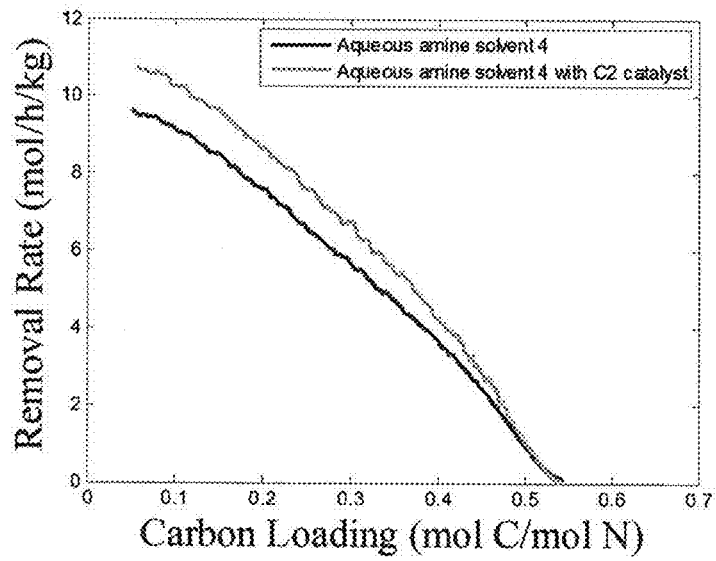

It can be seen that CAER C2 catalyst improves the absorption rate of 30 wt % MEA by about 70% at the $CO_2$ loading of 0.4 (C/N) which is the average working loading in a typical $CO_2$ capture cycle (see FIG. 3). Furthermore, the enhancement in MEA is seen across the entire $CO_2$ loading range. From a process perspective this would reduce the size of the absorber tower needed by increasing the overall mass transfer rate. To show the versatility of the catalyst 4 other candidate amines were tested using the same amine and the same loading of the CAER-C2 catalyst (see FIGS. 4-7). Although the initial absorption rates for the other solvents (aqueous amine solvents from 1 to 4) by themselves are faster than 30 wt % MEA, their rates can still be enhanced by an averaged 20% using the CAER C2 catalyst. The CAER-C2 catalyst clearly shows applicability in a wide range of $CO_2$ capture solvents.

EXPERIMENTAL

Figure 2:
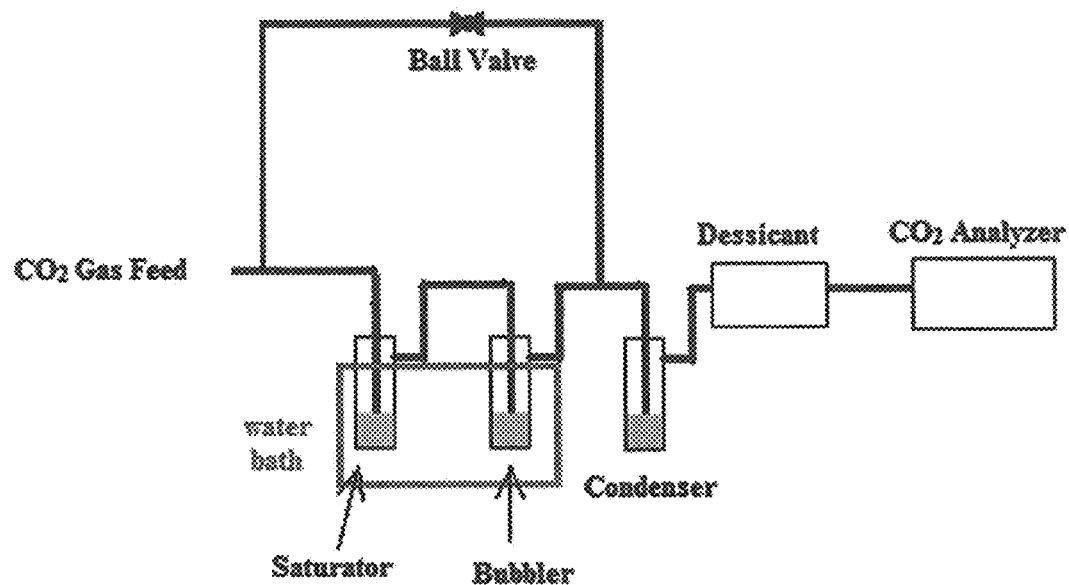
FIG. 2 is a schematical illustration of a $CO_2$ bubbling apparatus for quick and accurate evaluation of catalytic solvents.

A $CO_2$ bubbling apparatus is used for quick and accurate evaluation of catalytic solvents. A schematic of the apparatus is shown in FIG. 2. Briefly, 0.85 L/min feed gas containing ~13% $CO_2$ mixed with $N_2$ is firstly saturated with water in the first impinger and then bubbled through 15 ml of testing solvent in the second impinger. Both the saturator and bubbler are immersed in a water bath at 40° C. The gas effluent is dried through an ice condenser and a Drierite tube before it is analyzed for $CO_2$ concentration using a dual-beam NDIR online $CO_2$ analyzer (Model 510, HORIBA, Ltd). Data of $CO_2$ outlet concentration with respect to time is continuously recorded through a LABVIEW® package with 1 second interval. A line that bypasses the saturator and the bubbler is set up for inlet $CO_2$ concentration determination. Before each experiment, the alkalinity of the solvent is precisely determined through acid-base titration. In addition to the aqueous solvent, 0.1 wt % of antifoam was added to the testing solvents to eliminate the possible bias from foaming. A small amount of pyridine was added to the catalyst before adding to the test solution to help solubilize the CAER-C2 species. The final catalyst concentration is 3 g/L (3.02 mM).

The difference of inlet and outlet $CO_2$ concentration represents the absorbed amount of $CO_2$ at a particular time. The integration of the concentration difference represents the $CO_2$ loading as expressed $$CO_2 \text{ Loading } (t) \text{ (mol } CO_2/\text{kg solution)} = \frac{\int_0^t (C_{in} - C_{out}(t)) dt}{m_{sol}} \quad \text{Eq 1}$$

in which $C_{in}$ is the $CO_2$ feed gas rate in mol/s, $C_{out}$ is the $CO_2$ effluent rate in mol/s, t is the time in second, and $m_{sol}$ is the mass of solution in kg. The $CO_2$ loading at $C_{out}=C_{in}$ is the equilibrium $CO_2$ capacity at 13% $CO_2$ and 40° C. With the alkalinity (mol active nitrogen/kg of solution) of the solution known, the $CO_2$ loading can also be written as $$\alpha = \frac{CO_2 \text{ Loading (mol } CO_2/\text{kg solution)}}{\text{alkalinity(mol } acive \text{ nitrogen/kg solution}} \quad \text{Eq 2}$$

In addition, the absorption rate can be described by the derivate of $CO_2$ loading with respect to time:

$$\text{Absorption rate(mol } CO_2/\text{kg solution/s)} = \frac{dCO_2 \text{ Loading}}{dt} \quad \text{Eq 3}$$

Stability

A functional catalyst is only useful to industry if it is capable of surviving the operational conditions. In the case of thermal swing amine based $CO_2$ capture a high temperature stripper is utilized to regenerate the solvent, to be cycled for additional $CO_2$ capture, and to liberate concentrated $CO_2$ gas for subsequent compression. This requires multiple cycling between $CO_2$ absorption ($CO_2$ capture) and high temperature regeneration. The stability and robustness of catalyst CAER-C2 was tested by heating at 100° C. for 90 h and observing catalyst decomposition via UV-Vis analysis. Specifically, the catalyst UV-Vis absorption band area was monitored continuously over the test for change. After 90 h of heating a 2 mM CAER-C2 catalyst solution in 30 wt % MEA and a proprietary amine solvent there was evidence of <10% catalyst decomposition. This is equivalent to roughly 40 days of operation, assuming a 10 min residence time in the stripper compared to a full solvent cycle of 60 min.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A compound having a chemical formula:

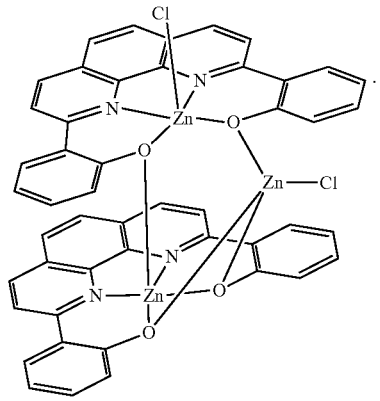

2. A method of scrubbing an acid gas comprising: adding a catalyst compound to a solution including an acid gas and an acid gas scrubbing solvent, said catalyst compound having a chemical formula:

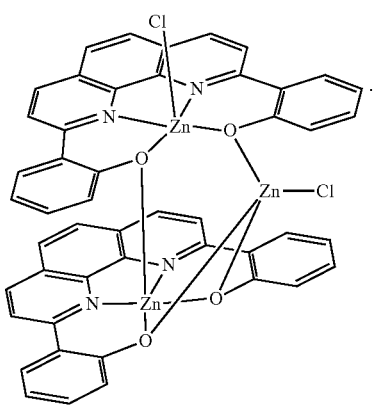

3. The method of claim 2 wherein said acid gas scrubbing solvent includes an amine.

4. The method of claim 2, wherein said acid gas scrubbing solvent includes a mixture of a primary amine and a tertiary amine.

5. The method of claim 2, wherein said acid gas scrubbing solvent is selected from a group consisting of monoethanolamine, 1-amino-2-propanol (1A2P), 3-amino-1-propanol, 2-amino-1-propanol, 2-amino-1-butanol, 1-amino-2-butanol, 3-amino-2-butanol, 2-(methylamino)ethanol (MAE), 2-(ethylamino)ethanol, morpholine, piperazine (PZ), 1-methylpiperazine (NMP), 2-methylpiperazine, hydroxypiperadine, 2-piperidineethanol, N-aminoethylpierazine (AEP), aminopropylmorpholine, 4-aminopiperidine, 2-Amino-2-methyl-1-propanol (AMP), diethanolamine (DEA), diisopropanolamine (DIPA), glycine, alanine, R-alannine, sarcosine, ethylene diamine (EDA), 1,3-propanediamine, 1,4-butanediamine, 1,5-pentanediamine, 1,6-hexanediamine, methyldiethanolamine (MDEA), triethanolamine (TEA), dimethylethanolamine (DMEA), N,N,N',N'-tetramethyl-1,8-naphthalenediamine, diethylmonoethanolamine, dipropylmonoethanolamine, 1,4-dimethylpiperazine, N N,N',N'-tetramethyl-1,6-hexanediamine, N,N,N',N'-tetrakis (2-hydroxyethyl)ethylenediamine, N,N,N',N',N''-pentamethyldiethylenetriamine, N,N,N',N'-tetramethylethylenediamine, N,N,N',N'-tetramethylpropane-1,3-diamine, N,N,N',N'-tetramethylbutane-1,4-diamine, N,N,N',N'-tetramethyl-1,5-pentanediamine, potassium carbonate, and mixtures thereof.

6. The method of claim 2 wherein said catalyst compound is provided in said solution at a concentration of between 0.1 mM and 50 mM.

* * * * *